United States Patent
Lotspiech et al.

(10) Patent No.: US 6,883,097 B1
(45) Date of Patent: Apr. 19, 2005

(54) COINCIDENCE-FREE MEDIA KEY BLOCK FOR CONTENT PROTECTION FOR RECORDABLE MEDIA

(75) Inventors: Jeffrey Bruce Lotspiech, San Jose, CA (US); Ariel Virgil Mirles, San Jose, CA (US); Dalit Naor, Palo Alto, CA (US); Sigfredo Ismael Nin, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,740

(22) Filed: May 22, 2000

Related U.S. Application Data

(63) Continuation-in-part of application No. 09/065,938, filed on Apr. 24, 1998.

(51) Int. Cl.[7] .............................. H04N 7/167; H04L 9/00
(52) U.S. Cl. ....................... 713/193; 380/239; 380/277; 705/51
(58) Field of Search ................................ 713/151, 193; 380/239, 277; 705/51

(56) References Cited

U.S. PATENT DOCUMENTS

| | | | | |
|---|---|---|---|---|
| 4,694,491 A | | 9/1987 | Horne et al. ................... 380/20 |
| 4,887,296 A | * | 12/1989 | Horne ......................... 380/239 |
| 5,345,505 A | | 9/1994 | Pires ........................... 380/20 |
| 5,592,552 A | | 1/1997 | Fiat .............................. 380/21 |
| 5,923,754 A | * | 7/1999 | Angelo et al. ................. 705/54 |
| 6,118,873 A | * | 9/2000 | Lotspiech et al. .......... 380/277 |
| 6,542,608 B1 | * | 4/2003 | Scheidt et al. ................ 380/44 |

* cited by examiner

Primary Examiner—Gilberto Barron
Assistant Examiner—Benjamin E. Lanier
(74) Attorney, Agent, or Firm—John L. Rogitz

(57) ABSTRACT

A system for protecting content on recordable media for, e.g., DVD audio disks, flash memory media, or other media includes providing a media key block (MKB) on each media, with each MKB including 25,000 encryptions of a media key by 25,000 or so device keys. Each authorized player in the system has a single device key from among the system device keys with which to decrypt the media key. To avoid a coincidence attack in which a hacker can learn the MKB and associated media key and then guess at a device key without knowing its position in the MKB, the media key is XORed with a number representing each position in the MKB, and only then encrypted with the device key corresponding to that position.

7 Claims, 1 Drawing Sheet

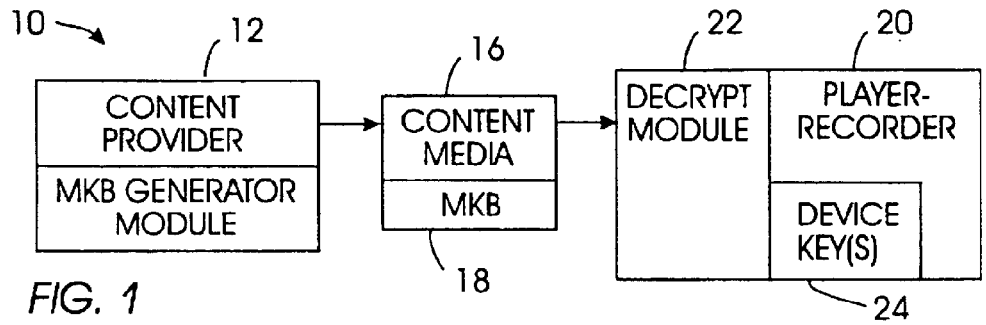
FIG. 1
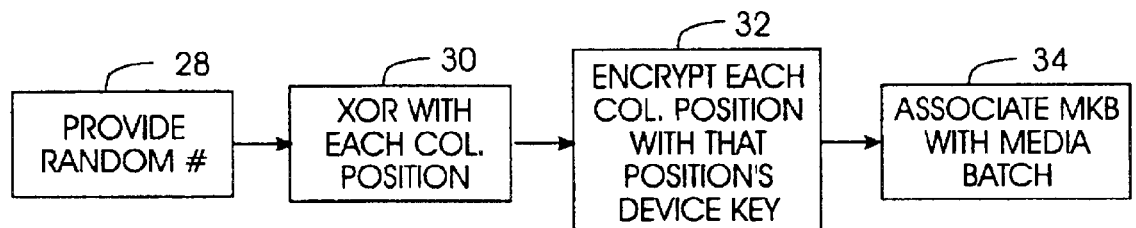
FIG. 2 - DEVICE KEY MATRIX
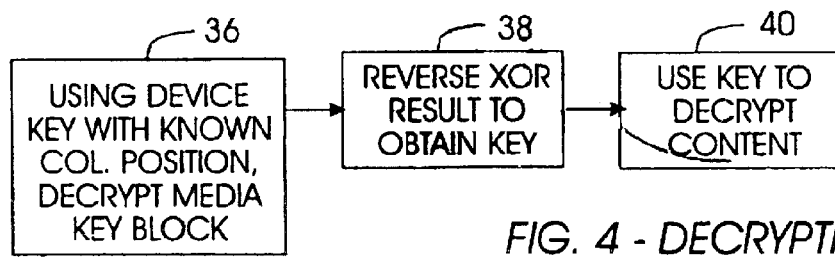

US 6,883,097 B1

COINCIDENCE-FREE MEDIA KEY BLOCK FOR CONTENT PROTECTION FOR RECORDABLE MEDIA

This application claims priority from co-pending U.S. patent application Ser. No. 09/065,938, filed Apr. 24, 1998, incorporated herein by reference.

BACKGROUND OF THE INVENTION

1. Field of the Invention

The present invention relates generally to broadcast data encryption that uses encryption keys.

2. Description of the Related Art

The above-referenced application discloses a system for encrypting publicly sold music, videos, nd other content. As set forth in the above-referenced application, only authorized player-recorders can play and/or copy the content and only in accordance with rules established by the vendor of the content. In this way, pirated copies of content, which currently cost content providers billions of dollars each year, can be prevented.

In the encryption method disclosed in the above-referenced application, authorized player-recorders are issued software-implemented device keys from a matrix of device keys. Specifically, the matrix of device keys includes plural rows and columns, and each authorized player-recorder is issued a single key from each column. The keys can be issued simultaneously with each other or over time, but in any event, no player-recorder is supposed to have more than one device key per column of the matrix. Using its device keys, an authorized player-recorder can decrypt a media key that in turn can be used to decrypt content that is contained on, e.g., a disk and that has been encrypted using the device keys. Because the player-recorder is an authorized device that is programmed to follow content protection rules, it then plays/copies the content in accordance with predefined rules that protect copyright owners' rights in digitized, publicly sold content.

In the context of DVD audio disks, it is anticipated that each column in the media key block will contain 25,000 entries, with each entry representing the encryption of a common media key using one of 25,000 device keys. A single media key block might apply, for instance, to a batch of 100,000 DVD disks or other media, such as CDs, flash memory, and hard disk drives. An authorized device can use its device key to decrypt the entry pertaining to it, to thereby obtain the media key. The media key is then used to decrypt the content.

The present invention recognizes that since each device key disclosed in the referenced application is 56 bits long, to guess a particular key would require, on average, $2^{55}$ guesses, currently an impractically large number for a hacker to deal with. The present invention further recognizes, however, that since a single media key is encrypted once for each of, say, 25,000 device keys in a column, if a hacker obtained a media key block and the associated media key, the hacker could encrypt the media key with a guessed-at device key and then determine whether the result matches any of the 25,000 entries in the media key block column. If so, the hacker has compromised a device key that can then be provided to pirate (unauthorized) recorders to decrypt media key blocks from the current disk batch or any subsequent disk batch. If no match is found by the hacker, the hacker tries again with another guessed-at device key. This type of attack, referred to herein as a "coincidence" attack, consumes time but not so much that hacking a device key becomes impracticable. It is against this attack that the present invention is directed.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A method for is disclosed for complicating a coincidence attack in a system for protecting content on recordable media. The method includes providing a single media key, and Transforming the media key using a position-specific function with each of a sequence of positions to render a sequence of position-dependent media keys. The method also includes encrypting each position-dependent media key with a respective position-dependent device key.

In another aspect, a system for complicating a coincidence attack in a system for protecting content on recordable media includes a media key block (MKB). The MKB includes plural encrypted entries, and each entry has a position in the MKB. Each entry is established at least in part by combining the entry with its respective position.

In still another aspect, a computer program device includes a computer program storage device that in turn includes a program of instructions which can be used by an encryption computer. The instructions include logic means for receiving a media key, and logic means for altering the media key with each of a sequence of numbers to render a sequence of media keys. Logic means encrypt each key in the sequence of media keys with a respective device key associated with the respective number.

In yet another aspect, a computer program device a computer program device includes a computer program storage device that in turn includes a program of instructions which can be used by a decryption computer. The instructions include logic means for receiving a media key block (MKB) having plural positions, with each position having a number related thereto. Logic means access a device key. The device key is associated with a position corresponding to one of the positions of the MKB. The position that is associated with the device key is known to the decryption computer. Logic means are provided for decrypting the number at a position in the MKB corresponding to the position associated with the device key to render a decrypted position-dependent media key. Then, logic means are invoked for reverse transforming the position-dependent media key with a number representing the position of the position-dependent media key in the MKB, to render a media key.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a schematic diagram of a device key matrix;

FIG. 3 is a flow chart of the encryption logic; and

FIG. 4 is a flow chart of the decryption logic.

DETAILED DESCRIPTION OF THE PREFERRED EMBODIMENTS

Referring initially to FIG. 1, a system is shown, generally designated 10, for encrypting content in a broadcast content guard system, such as but not limited to the system disclosed in the first of the above-referenced applications. By "broadcast" is meant the wide dissemination of a program from a content provider to many users simultaneously over cable (from a satellite source), or wire, or radiofrequency (including from a satellite source), or from widely marketed content disks.

As shown, the system 10 includes a content provider 12 that accesses a media key block (MKB) generator module 14 that functions in accordance with disclosure below to encrypt content on a content media 16. The MKB 18 is provided on the media 16. A player-recorder 20 can access a decryption module 22, which uses one or more device keys 24 to operate on the MKB 18 to decrypt the content on the media 16, again in accordance with disclosure below. As used herein "media" can include but is not limited to DVDs, CDs, hard disk drives, and flash memory devices.

It is to be understood that the processors associated with the modules 14, 22 access the modules to undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

For a full understanding of the details of the preferred broadcast encryption scheme and how it can be used to defeat unauthorized copyists, reference is made to the above-referenced patent application. To summarize the preferred broadcast encryption logic set forth therein, however, as shown in FIG. 2 a device key matrix 26 is generated, with each device key $S_{j,i}$ being a random number of predetermined bit size, in one preferred embodiment 56 bits or in another embodiment 64 bits. Per present principles, i=the integers from 1 to N inclusive and j=the integers from 1 to M inclusive, wherein M might equal, for example, 25,000. "I" is a key index variable and "j" is a sets index variable. Each authorized player-recorder is then assigned selected keys "S" from the matrix by a licensing agency, with each key being associated with its known position in the column, i.e., its "j" number, and thus with a player-recorder knowing both its device key and the device key's position in the matrix 26. For example, a first player-recorder might be assigned the keys $S_{3,1}$, $S_{5,2}$, $S_{1,3}$, $S_{1,4}$, $S_{6,5}$, $S_{4,6}$, and $S_{8,7}$. In any case, each player-recorder is assigned "N" device keys, and each player-recorder is assigned one and only one device key "S" for each key index variable "i" (i.e., for each column). Embodiments, however, wherein a device might not include a device key for each and every $i^{th}$ position are within the scope of the above-referenced invention.

No single authorized player-recorder learns two keys at the same position in the key index dimension. Preferably, no player-recorder has exactly the same device keys "S" as any other device, although the device keys of many devices might overlap.

After having provided the device key matrix 26, a media key block (MKB) is constructed as follows. For each column, a random number is provided (or a version thereof hashed with a known number) that establishes a media key. The media key is encrypted with each device key in a column. A single column of encrypted versions of media keys (or multiple columns, each representing its own media key) establishes a media key block (MKB) (also referred to in the above-referenced application as a "session key block"). A single MKB might be provided for, e.g., a batch of 100,000 content media.

When an authorized player-recorder receives content on, e.g., a disk, the MKB is provided on the media and is thus also received. Using its device key, the player-recorder decrypts the media key, and then using the media key the player-recorder decrypts the content. Further details of this operation is found in the above-referenced application. The present invention adds a step to the above-described operation to foil the above-described "coincidence" attack.

Specifically, commencing at block 28 in FIG. 3, a random number that establishes the media key (or equivalently a hashed version thereof) is provided for each column of the matrix 26. Thus, every column is given the same media key. In one preferred embodiment, the length of the media key is sixty four (64) bits.

Moving to block 30, the media key of a column is altered in each position in the column using a position-specific function. In the presently preferred embodiment the media key is XORed with a number, e.g., an integer, representing a position in the "j" dimension to render a respective position-dependent media key. Thus, the media key is XORed with numbers representing each of the sequence of "M" positions in the "j" dimension to render a sequence of "M" position-dependent media keys. Other position-specific functions such as addition, subtraction, and so on can be used.

Then, at block 32 each position-dependent media key is encrypted with the device key having its position in the "j" dimension corresponding to the position of the position-dependent media key. In this way, the MKB 18 is rendered, and at block 34 it is associated with a batch of media.

FIG. 4 shows that authorized player-recorders reverse the above steps to play the content. Specifically, at block 36, using its device key $S_{j,i}$ for the $i^{th}$ column, a player-recorder decrypts the MKB, and more specifically decrypts the position-dependent media key at the $j^{th}$ position in the MKB. Moving to block 38, the player-recorder reverse XORs the position-dependent media key with the number representing the $j^{th}$ position to render the media key. At block 40 the media key can be used to decrypt content.

It will be appreciated that while an authorized player-recorder knows both a device key and its position in the matrix 26, a pirate who guesses at a device key might guess the correct key, but would also then have to guess its position, thereby transforming the above-described coincidence attack back into a problem that as a practical matter is not solvable.

While the particular COINCIDENCE-FREE MEDIA KEY BLOCK FOR CONTENT PROTECTION FOR RECORDABLE MEDIA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or, in the case of a method claim, the element is recited as a "step" instead of an "act".

We claim:

1. A system for complicating a coincidence attack in a system for protecting content on recordable media, comprising:
    a media key block (MKB), the MKB including plural encrypted entries, each entry having a position in the MKB, each entry being established at least in part by transforming a key number using a position number representing the position in the MKB of the respective key number.

2. The system of claim 1, wherein an entry is established by a media key.

3. The system of claim 1, wherein each entry is established by the same media key as all other entries, the media key being combined with each of a sequence of positions to render a sequence of position-dependent media keys.

4. The system of claim 3, wherein each position-dependent media key is encrypted by a respective device key.

5. The system of claim 4, further comprising plural players, each having a device key of known position with which to decrypt the media key to play content encrypted with the media key.

6. A computer program device, comprising:
    a computer program storage device including a program of instructions usable by a decryption computer, comprising:
    logic means for receiving a media key block (MKB) having plural positions, each position having a number related thereto;
    logic means for accessing a device key, the device key being associated with a position corresponding to one of the positions of the MKB, the position associated with the device key being known to the decryption computer;
    logic means for decrypting the number at a position in the MKB corresponding to the position associated with the device key to render a decrypted position-dependent media key; and
    logic means for reverse transforming the position-dependent media key with a number representing the position of the position-dependent media key in the MKB, to render a media key.

7. The computer program device of claim 6, further comprising logic means for decrypting content using the media key.

* * * * *